(12) United States Patent
Johnston et al.

(10) Patent No.: US 12,542,827 B2
(45) Date of Patent: Feb. 3, 2026

(54) TRUSTED AND SECURE PEER-TO-PEER BACKUP AND RECOVERY

(71) Applicant: Cisco Technology, Inc., San Jose, CA (US)

(72) Inventors: Jay Kemper Johnston, Raleigh, NC (US); Magnus Mortensen, Cary, NC (US); David C. White, Durham, NC (US)

(73) Assignee: Cisco Technology, Inc., San Jose, CA (US)

( * ) Notice: Subject to any disclaimer, the term of this patent is extended or adjusted under 35 U.S.C. 154(b) by 351 days.

(21) Appl. No.: 18/136,104

(22) Filed: Apr. 18, 2023

(65) Prior Publication Data

US 2024/0357007 A1 Oct. 24, 2024

(51) Int. Cl.
*H04L 67/1061* (2022.01)
*G06F 11/14* (2006.01)

(52) U.S. Cl.
CPC ...... *H04L 67/1065* (2013.01); *G06F 11/1464* (2013.01)

(58) Field of Classification Search
CPC ............... H04L 67/1065; G06F 11/1464
See application file for complete search history.

(56) References Cited

U.S. PATENT DOCUMENTS

| | | | |
|---|---|---|---|
| 2003/0126247 A1* | 7/2003 | Strasser | G06F 11/1458 |
| 2009/0027014 A1* | 1/2009 | Sartore | G11C 16/30 |
| 2010/0030823 A1* | 2/2010 | Meller | G06F 8/658 |
| 2017/0177449 A1* | 6/2017 | Bronk | H04W 4/70 |
| 2018/0323970 A1* | 11/2018 | Maron | H04L 9/0891 |
| 2019/0305948 A1 | 10/2019 | Barbas et al. | |
| 2020/0344247 A1* | 10/2020 | Fleming | G06F 11/1464 |
| 2022/0075695 A1 | 3/2022 | Khan et al. | |

FOREIGN PATENT DOCUMENTS

EP 2003842 A1 12/2008

OTHER PUBLICATIONS

Search Report and Written Opinion for International Application No. PCT/US2024/024936, Dated Jun. 26, 2024, 14 pages.

* cited by examiner

*Primary Examiner* — Ronald B Abelson
(74) *Attorney, Agent, or Firm* — Lee & Hayes, P.C.

(57) ABSTRACT

Techniques for peer-to-peer backup in an administrative domain are described. The techniques may include identifying, by a first device, a second device as a trusted peer device. The techniques may also include receiving an advertisement that the second device supports a peer-to-peer backup system and transmitting an acknowledgement to the second device that the first device supports the peer-to-peer backup system. Additionally, techniques may include receiving a request to store backup data associated with the second device on the first device, the request may include an amount of memory needed. If the first device has the needed memory, the first device may transmit an indication that the memory is available. The indication may include a recovery key. The first device may then receive backup data associated with the second device, encrypted with the recovery key, and store the encrypted backup data in memory reserved for peer-to-peer backup data.

20 Claims, 6 Drawing Sheets

FIG. 6

TRUSTED AND SECURE PEER-TO-PEER BACKUP AND RECOVERY

TECHNICAL FIELD

The present disclosure relates generally to techniques for providing the ability for devices within an administrative domain to periodically and automatically save critical operational data to its layer-2 adjacent peers.

BACKGROUND

In today's competitive market, a network is considered one of the most critical resources in the organization. The ability to transmit data accurately and in a timely manner, is vital to the success of any enterprise organization. A successfully functioning network depends on every node in the network functioning as intended. Thus, the ability to successfully replace network devices in a network that experiences an unexpected device failure or even theft is of the utmost importance. Thus, typically an enterprise organization relies on some kind of configuration and backup management system to address these issues. Conventional configuration backup and management systems are often a centralized configuration and/or out of band from the network devices that might fail (e.g., are many hops away in the network) and often require connectivity back to the configuration system to get a full configuration back onto a device. Additionally, in the event of a catastrophic outage, connectivity back to the configuration system may not be available. Finally, conventional backup and management systems also typically require extensive manual intervention in order to get a replacement network device up and running in the network, and that is assuming an enterprise organization has good backup hygiene, in other words, backups are current and readily available. Thus, it is not easy to swap in a replacement network device, because the configuration is not readily available or recoverable. The result is that in order to bring a network back up after a network device fails, a replacement device must be re-built essentially from scratch, resulting in significant time. While the network is down, business may be severely impacted.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes method(s) where devices within an administrative domain periodically and automatically save critical operational data to its layer-2 adjacent peers, thus enabling a one-to-one swap of a failed device and providing for a peer-to-peer recovery procedure. The method may be performed at least in part by a first network device in an administrative network domain. The method includes identifying a second network device as a trusted peer device. The method also includes receiving an advertisement from the second network device that indicates the second network device supports a peer-to-peer backup system. In addition, the method includes transmitting an acknowledgment to the second network device that the first network device supports the per-to-peer backup system. The method also includes, receiving, from the second network device, a request to store backup data associated with the second network device on the first network device, the request including an amount of memory needed to store the backup data associated with the second network device. In response to the first network device having the amount of memory available in memory reserved for peer-to-peer backup data, transmitting, to the second network device, an indication that the amount of memory is available on the first network device, the indication including a recovery key. The method also includes receiving, from the second network device, backup data associated with the second network device encrypted with the recovery key and storing the encrypted backup data associated with the second network device in memory reserved for peer-to-peer backup data. Additionally, or alternatively, the method includes identifying a third network device as a trusted peer device and receiving an advertisement from the third network device that indicates the third network device supports the peer-to-peer backup system. The method may also include transmitting an acknowledgement to the third network device that the first network device supports the peer-to-peer backup system. The method may also include receiving, from the third network device a request for the encrypted backup data associated with the second network device and transmitting the encrypted backup data associated with the second network device to the third network device.

Additionally, the techniques described herein may be performed by a system and/or device having non-transitory computer-readable media storing computer-executable instructions that, when executed by one or more processors, performs the method described above.

Example Embodiments

As described above, conventional network configuration and management systems typically employ a centralized system where network device configurations are managed by a centralized controller. Thus, when a network device needs to be replaced (e.g., because of failure, theft, etc.), maintenance personal must physically replace the device, then the device configuration must be installed by an external console, provisioned by a provisioning system, or somehow otherwise provided or copied to the network device from the centralized controller before the new replacement network device may be online and the network as a whole back up and functioning properly. This disclosure describes techniques for devices within an administrative domain to periodically and automatically save critical operational data to its layer-2 adjacent peers, thus enabling a one-to-one swap of a failed device and providing for a peer-to-peer recovery procedure. Essentially, a trusted and secure peer-to-peer backup system provides for a one-to-one physical swap, where a new replacement network device learns its configuration from network peers and is up and running online automatically without any manually intervention to establish device configuration.

A trusted and secure peer-to-peer backup and recovery system is described herein. Devices within an administrative domain may periodically and automatically save critical operation data to its layer-2 adjacent peers. Critical data might include configuration data, certificates and keys, important telemetry, data relating to device or network crash information, or any other information that an enterprise organization deems critical. When a network device fails, a replacement device is connected in its place and after entering authentication information, the critical data can be replicated back to the replacement device form its peers, allowing rapid restoration of network services. Although primarily described herein with reference to network devices within a same administrative network, it should be understood that the techniques described may also be used across domains that have established trust between them. For example, trust may be established between an ISP router and a customer premise device. Thus, the ISP router and customer premise device may store backup data for one another if they both support a peer-to-peer backup and recovery system feature.

Network devices within an administrative domain identify each other as trusted and co-members of that domain. The network devices may then advertise its ability to support a peer-to-peer backup and recovery system and in turn, the network device peers that also support this feature will acknowledge its support. This advertisement and acknowledgement process is easily done by layer-2 transmission protocols (e.g., Cisco Discovery Protocol (CDP), Link Level Discovery Protocol (LLDP), etc.). Once trusted peers that support the peer-to-peer backup and recovery system are established, a network device may advertise to a trusted peer that it wants to backup its configuration and how much memory is needed for the backup. Each network device that supports the peer-to-peer backup and recovery system will allocate a portion of its memory to a peer data vault for peer-to-peer backup data and establish a recovery key. If the peer device has the requested amount of memory available in its peer data vault, the peer device will send a message informing the network device that the peer device has the memory available and approving the backup. The network device will then encrypt its backup data using the recovery key and transmit that encrypted backup data to the peer device. In addition, a short request message is also encrypted separately, which is used to validate a future restore request. The peer device will then store the backup data of the network device in its peer data vault.

Alternately or in addition, a network device may send its critical backup data to more than one peer device. For example, a network device may send critical backup data to every other hop in a network, or every N hop in the network. In some examples, a network device may not send all of its critical backup data to a single peer device. Instead, the network device may transmit a portion of its backup data to several different peer devices. Additionally, the network device, may send the same portion to multiple peer devices. Sending critical backup data (or portions of critical backup data) to more than one peer device ensures that in the event of multiple network device failures (e.g., a site with a bank of routers goes down), critical backup data for each network device will not be lost, and when replacement devices are installed in the network, device configuration is easily and quickly restored.

In some examples, once the network devices in an administrative domain have been backed up to its peer devices, the backups are periodically refreshed as system configuration changes or other key information changes on network devices. Additionally, each network device in the administrative domain checks in periodically (e.g., once a day) to notify its peer devices that it is still active. In the event that a network device does not check in with its peers for a threshold amount of time (e.g., 30 days) the backup data for that network device will be purged from its peers.

When a network device fails in an administrative domain in which the network devices support a peer-to-peer backup and recovery system, a replacement device is pre-configured with information that will allow it to join the administrative domain as a trusted co-member and plugged into the network. The preconfigured information may be a certificate provisioned by a central PKI loaded onto the replacement device, a domain password, or any other appropriate identifying characteristic that will allow the replacement device to become a trusted member of the administrative domain. Once the replacement device is plugged into the network and successfully joins the administrative domain, the replacement device enables the trusted peer-to-peer backup and recovery feature and discovers its peers, as described above. The replacement device asks, by sending its encryption key to its peers, if any of its peers have current backup data for the network device being replaced that the replacement device can download. When the request is received, each peer device looks down its list of backups that it has stored in memory for peer-to-peer backup data and compares the cyphertext of the request sent to the cyphertext associated with each backup the peer has stored in its peer data vault. If a match is found, the peer device acknowledges that it has a backup and sends the encrypted backup to the replacement device. The replacement device receives the restore command with backup and decrypts the backup and applies it. The replacement device is now properly configured and operational, and the network is restored. The same process applies if no single peer device has all backup data for the device being replaced, but instead the backup data is shared across multiple peers. Each peer with a portion of the backup data (determined by matching the cyphertext of the request with a cyphertexts associated with a portion of the backup data) will transmit the portion it has stored to the replacement device, and the replacement device will decrypt and apply.

In various examples, to ensure that only trusted devices are able to save and recover critical peer backup data, a peer-to-peer backup and recovery system may leverage client certificates (certificate and key pairs) provisioned for each device by a central trusted certificate authority (CA) within an enterprise organization. When initially enabling the peer-to-peer backup and recovery system feature on a network device, the certificate is used to sign and encrypt the backup sent to its peers. During the recovery process, the replacement device will be pre-configured with the requisite certificate and private key. This will enable the device to advertise what its identity is, and its peers will be able to validate and trust the advertisement and select the appropriate backup data if available in peer-to-peer backup memory. Methods for identifying and authenticating a peer device may leverage client certificates issued for the devices in question, resulting in the only bootstrapping needed for recovery being the reapplication of the former devices cert and key from a secure long-term storage within the enterprise organization. Thus, once a replacement device in physically installed in the network, it is automatically configured via its peers and no other manual intervention is necessary.

In some examples, a network device may advertise to its peers that it has more, or less memory available than indicated for a requested backup. In this situation, the transmitting device can increase or reduce the amount of telemetry sent for backup accordingly. Alternately, or in addition, the transmitting device may send telemetry more or less frequently. Network devices may send critical backup data to more than one peer, or some minimum number of peers if space allows. A device may choose to share its configuration data across multiple peers, such that no single peer can restore a device on its own. In various examples, devices may pass critical backups around the network to ensure that they propagate far enough away from the network device so that if a large portion of the network is brought down (e.g., a bank of routers is hit by lightning) the backups are far enough away from the network device being replaced that they survive the outage.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
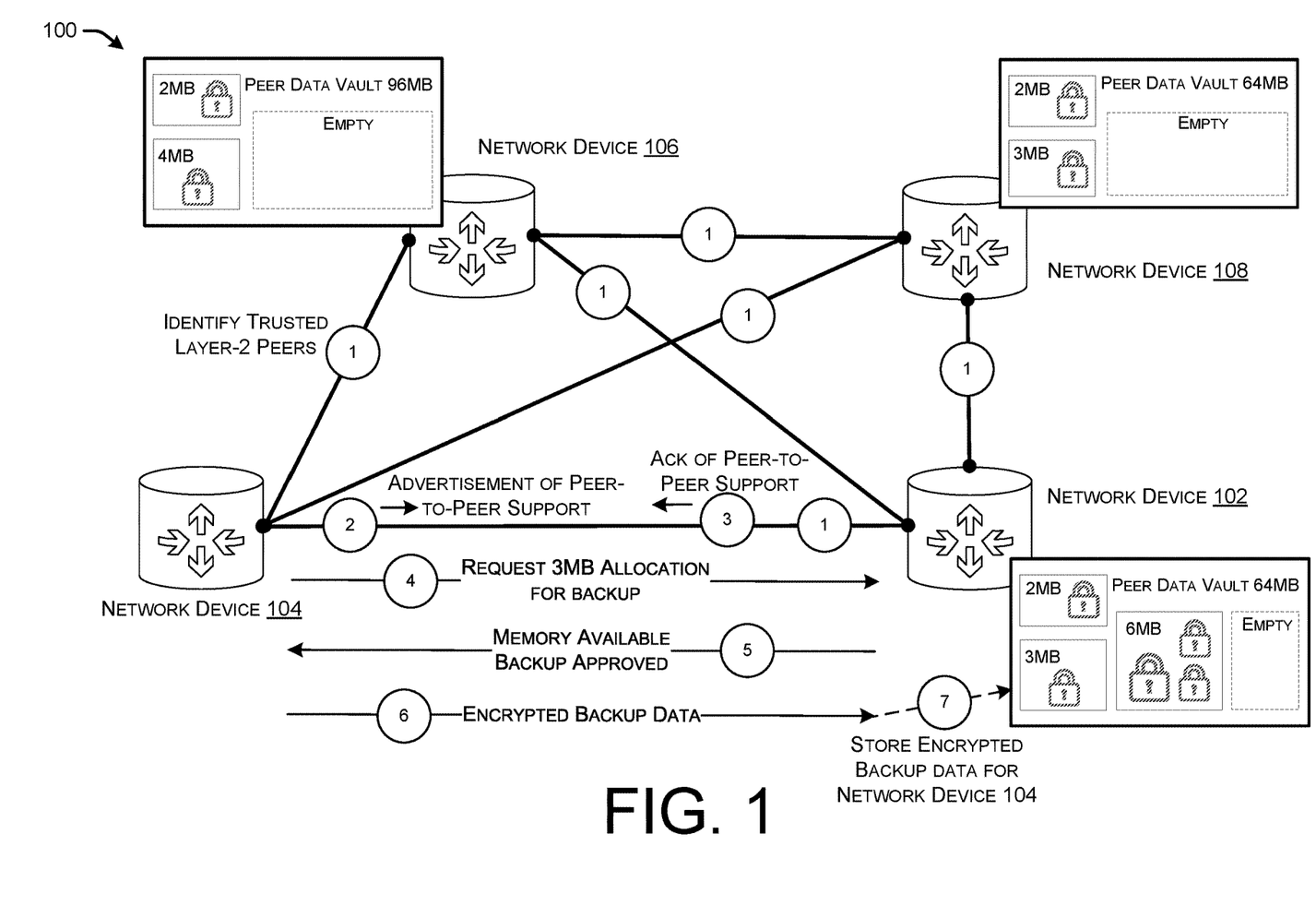
FIG. 1 illustrates an example network that may implement various aspects of the technologies directed to a trusted and secure peer-to-peer backup procedure as described herein.

FIG. 1 illustrates an example network 100 that may implement various aspects of the technologies directed to a trusted and secure peer-to-peer backup procedure. Network 100 includes network device 102, network device 104, network device 106, and network device 108. Although network 100 illustrates the network devices 102-108 as routers, the network may include other types of network devices and more or less network devices than illustrated. Included in each network device 102-108 is a peer data vault. A peer data vault is memory dedicated to storing critical backup data of adjacent layer-2 peers in an administrative domain. For example, network device 108 contains a peer data vault having 64 MB of total memory, including a portion of 2 MB that currently stores critical backup data for a peer device, and a 3 MB portion that stores critical backup data for another peer device, leaving 59 MB of storage available for critical backup data of additional peer devices.

To implement techniques for a trusted and secure peer-to-peer backup procedure, at (1) the network devices 102-108 in the administrative domain identify each other as trusted and co-members of the domain. The network devices 102-108 may then advertise its ability to support a peer-to-peer backup and recovery system and in turn, the network device peers that also support this feature will acknowledge its support. For example, in FIG. 1, network device 104 advertises its ability to support the peer-to-peer backup and recovery system at (2) and network device 102 sends an acknowledgement of peer-to-peer backup and recovery support to network device 104. The advertisement and acknowledgement may be done using layer-2 transmission protocols such as CDP, LLDP or any other appropriate protocol.

At (4) network device 104 sends a request to network device 102 indicating that network device 104 needs to backup 3 MB of critical data. Although not illustrated, network device 104 may also send a request to network device 106 and/or network device 108 to backup 3 MB of data, such that multiple peer devices would have the backup data for network device 104 stored in its peer data vault. In another example, network device 104 may send a request to each of network devices 102, 106, and 108 to store a 1 MB portion of backup data in each of network devices 102, 106, and 108. In this example, each peer device would store a portion of the backup data for network device 104, such that no single peer device may recover the configuration of network device 104 on its own.

At (5) if network device 102 has the requested amount of memory available in its peer data vault, network device 102 sends a message to network device 104 indicating that the memory is available, and an approval to send that backup data. In the even that network device 102 does not have the amount of memory needed available, network device 102 will send an indication of memory that is available to network device 104. Network device 104 may then send a portion of its backup data to network device 102 that will fit in network device 102's peer data vault, or network device 104 may send its backup data to an alternate peer device. If network device 104 sends only a portion of its backup data to network device 102, network device may send a remaining portion of its backup data to either network device 106 or network device 108. Alternately, network device 104 may send a portion of its backup data to each of network device 102, network device 106, and network device 108. In still another example, network device 104 may send all of its backup data to each of network device 102, network device 106, and network device 108.

At (6) network device 104 will encrypt its backup data using a recovery key and transmit the encrypted backup data to network device 102. Additionally, network device 104 will send a short, encrypted request message which is used to validate a future restore request. At (7) network device 102 will store the encrypted backup data sent by network device 104 in its peer data vault.

Figure 2:
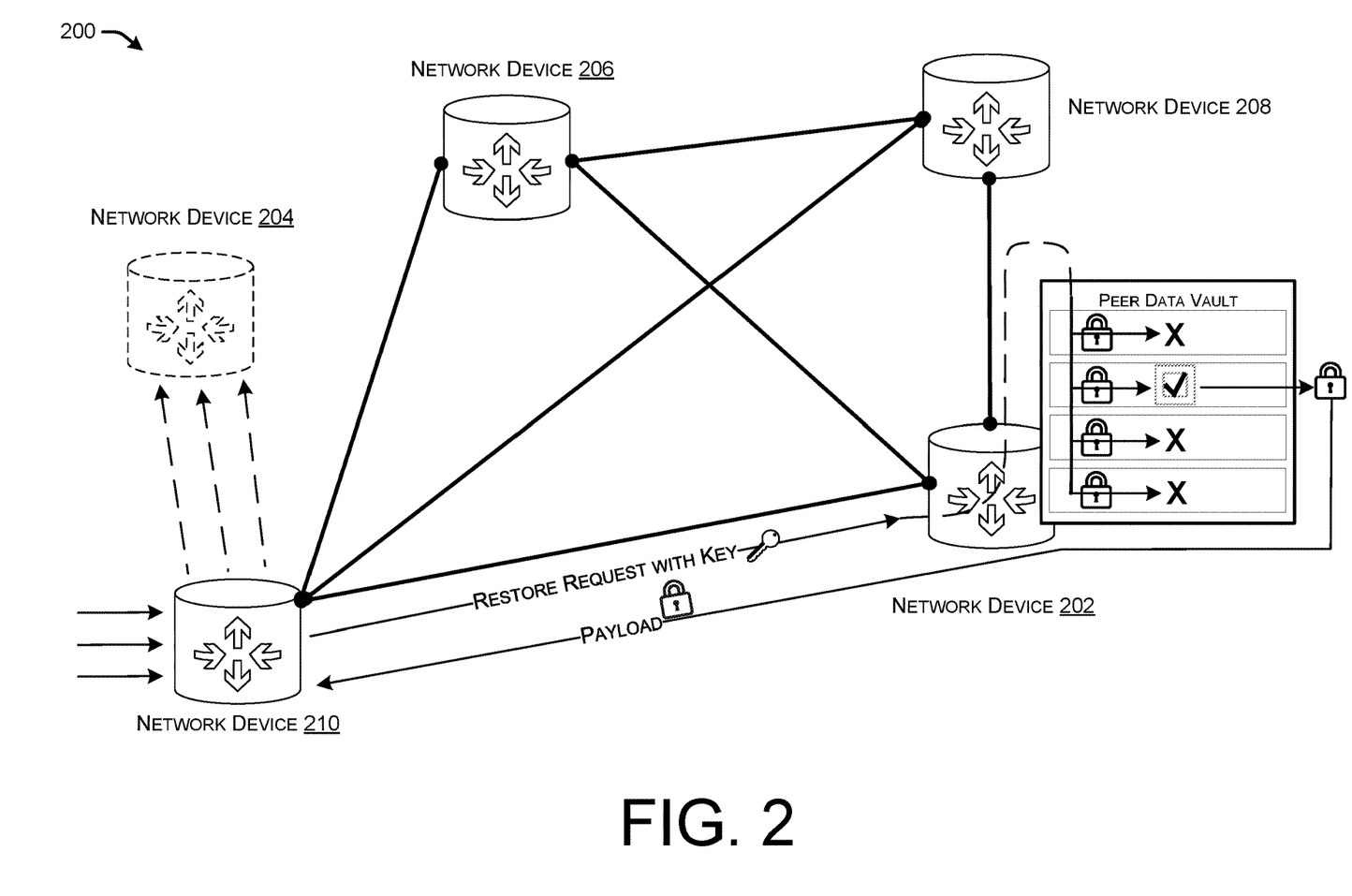
FIG. 2 illustrates an example network that may implement various aspects of the technologies directed to a trusted and secure peer-to-peer recovery procedure as described herein.

FIG. 2 illustrates an example network 200 that may implement various aspects of the technologies directed to a trusted and secure peer-to-peer recovery procedure. Network 200 includes network device 202, network device 204, network device 206, network device 208, and network device 210. Similar to network 100 of FIG. 1, network 200 illustrates the network devices 102-110 as routers, however the network 200 may include other types of network devices and more or less network devices than illustrated in FIG. 2. In network 200, network device 204 is being replaced by network device 210 (e.g., because of network device 204 failure). Network device 204 is manually removed from network 200 and network device 210 manually installed in its place.

Replacement network device 210 will be pre-configured with information that will allow it to join the administrative domain of network 200. The preconfigured information may be a certificate provisioned by a central PKI, a domain password, or any other appropriate means that will allow network device 210 to become a trusted member of the network 200 when it is physically installed. Once network device 210 is installed, and successfully joins the administrative domain, network device 210 enables the trusted peer-to-peer backup and recovery feature and discovers its peers as described above. Network device 210 asks, by sending a restore request with encryption key to network device 202, network device 206, and network device 208, if any of its peers have current backup data for network device 204 that network device 210 is replacing. As illustrated in FIG. 2, when network device 202 receives the restore request, network device 202 looks down the list of backups that it has stored in its peer data vault and compares the cyphertext of the request sent to the cyphertext associated with each backup in the peer data vault (although not shown, network device 206 and network device 208 will implement the same procedure). When network device 202 finds a match in its peer data vault, network device 202 acknowledges that it has a backup and transmits the encrypted backup to network device 210.

Figure 3:
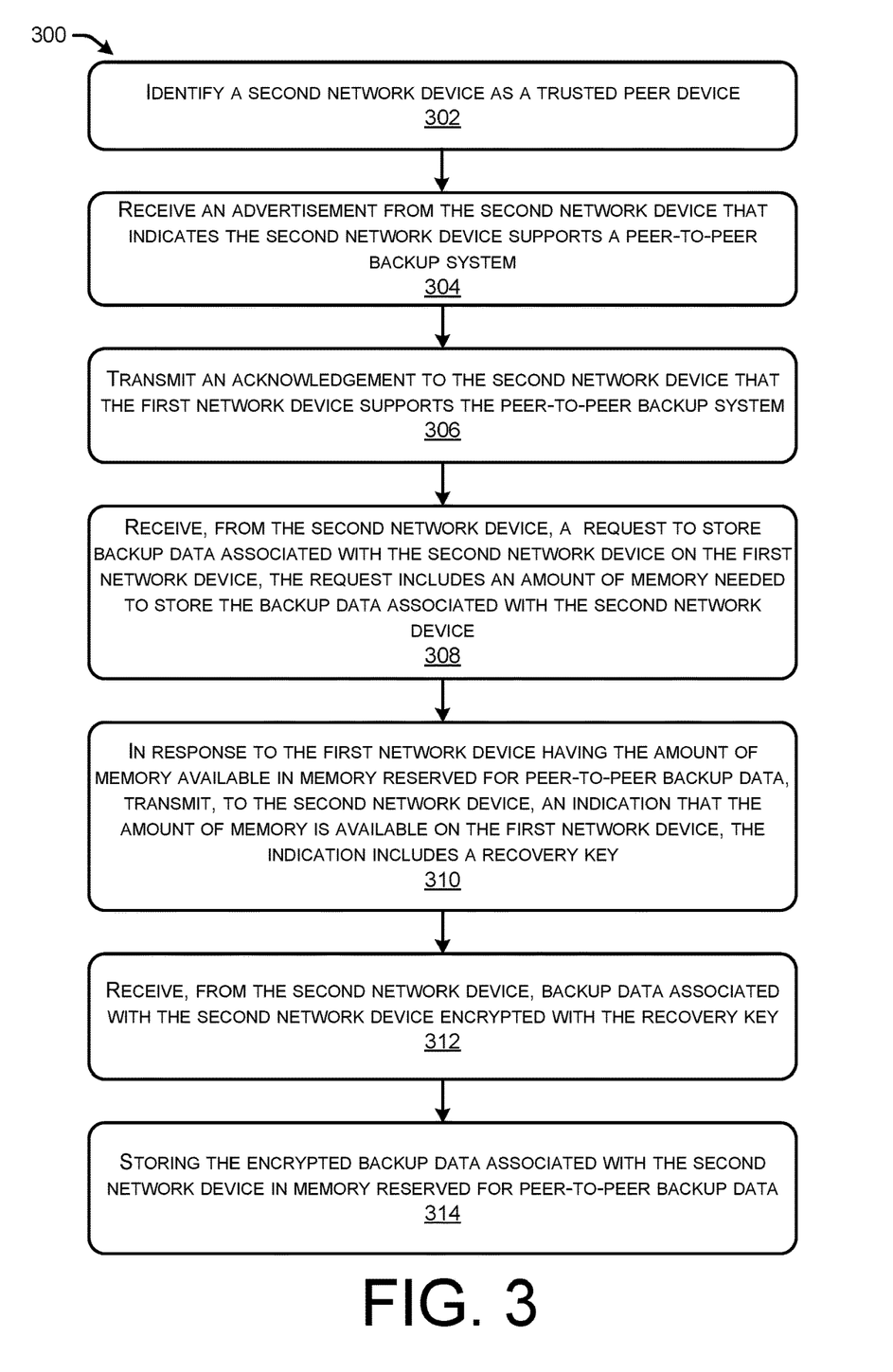
FIG. 3 is a flow diagram illustrating an example method associated with the techniques described herein for trusted and secure peer-to-peer backup of network devices in an administrative domain.

FIG. 3 is a flow diagram illustrating an example method 300 associated with the techniques described herein for trusted and secure peer-to-peer backup of network devices in an administrative domain. Example method 300 illustrates aspects of the functions performed at least partly by the network device 102 (and/or network device 104, 106, or 108) as described in FIG. 1. The logical operations described herein with respect to FIG. 3 may be implemented (1) as a sequence of computer-implemented acts or program modules running on a computing system and/or (2) as interconnected machine logic circuits or circuit modules within the computing system. In some examples, the method(s) 300 may be performed by a system comprising one or more processors and one or more non-transitory computer-readable media storing computer-executable instructions that, when executed by the one or more processors, cause the one or more processors to perform the method(s) 300.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

At operation 302, a first network device identifies a second network device as a trusted peer device. For example, with reference to FIG. 1 at (1) each of the network devices 102-108 identify each other as trusted peers and co-members of an administrative domain. Alternately or in addition, in some examples, techniques described herein may also be used across domains that have established trust between them. For example, trust may be established between an ISP router and a customer premise device enabling techniques described herein to be applied to network devices across domains.

At operation 304, the first network device receives as advertisement from the second network device that indicates the second network device supports a peer-to-peer backup system. For example, referring to FIG. 1 at (2) network device 104 sends a message to network device 102 advertising that network device 104 supports a peer-to-peer backup system. Network device 104 also send this advertisement to its other peer devices, network device 106 and network device 108.

At operation 306, the first network device transmits an acknowledgement to the second network device that the first network device supports the peer-to-peer backup system. Referring again to FIG. 1, at (3) network device 102 responds to network device 104 with an acknowledgement that network device 102 also supports the peer-to-peer backup system feature. Additionally, if network device 106 and network device 108 also support the peer-to-peer backup and recovery system, they will also send acknowledgements to network device 104.

At operation 308, the first network device receives, from the second network device, a request to store backup data associated with the second network device on the first network device, the request includes an amount of memory needed to store the backup data associated with the second network device. For example, in FIG. 1 network device 102 receives message (4) from network device 104 requesting 3 MB of memory to backup critical data associated with network device 104. In some examples, network device 104 may only request enough memory to store a portion of its backup data in its peer's peer data vault. In still another example, network device 104 may request to store its backup data in the peer data vault of more than one peer. For instance network device 104 may request to store its backup data with not only network device 102, but also network device 106 and/or network device 108.

At operation 310, in response to the first network device having the amount of memory available in memory reserved for peer-to-peer backup data, the first network device transmits to the second network device, an indication that the amount of memory is available on the first network device, the indication includes a recovery key. Referring again to FIG. 1, network device 102 checks its peer data vault to see if it has the requested memory available. As the requested memory is 3 MB, the peer data vault of network device 102 has sufficient memory available. Thus, at (5) network device 102 sends a message back to network device 104 indicating that is has the requested memory available and approving the backup request.

At operation 312, the first network device receives, from the second network device, backup data associated with the second network device encrypted with the recovery key. For instance, in FIG. 1 at (6) network device 104 encrypts is backup data and sends the encrypted backup data to network device 102 for storage in its peer data vault. In addition, a short request message is also encrypted separately and sent to network device 102, which is used to validate a future restore request.

At operation 314, the first network device stores the encrypted backup data associated with the second network device in memory reserved for peer-to-peer backup data. For example, in FIG. 1 at (7) network device 102 stores the encrypted backup it received from network device 104 in its peer data vault.

Figure 4:
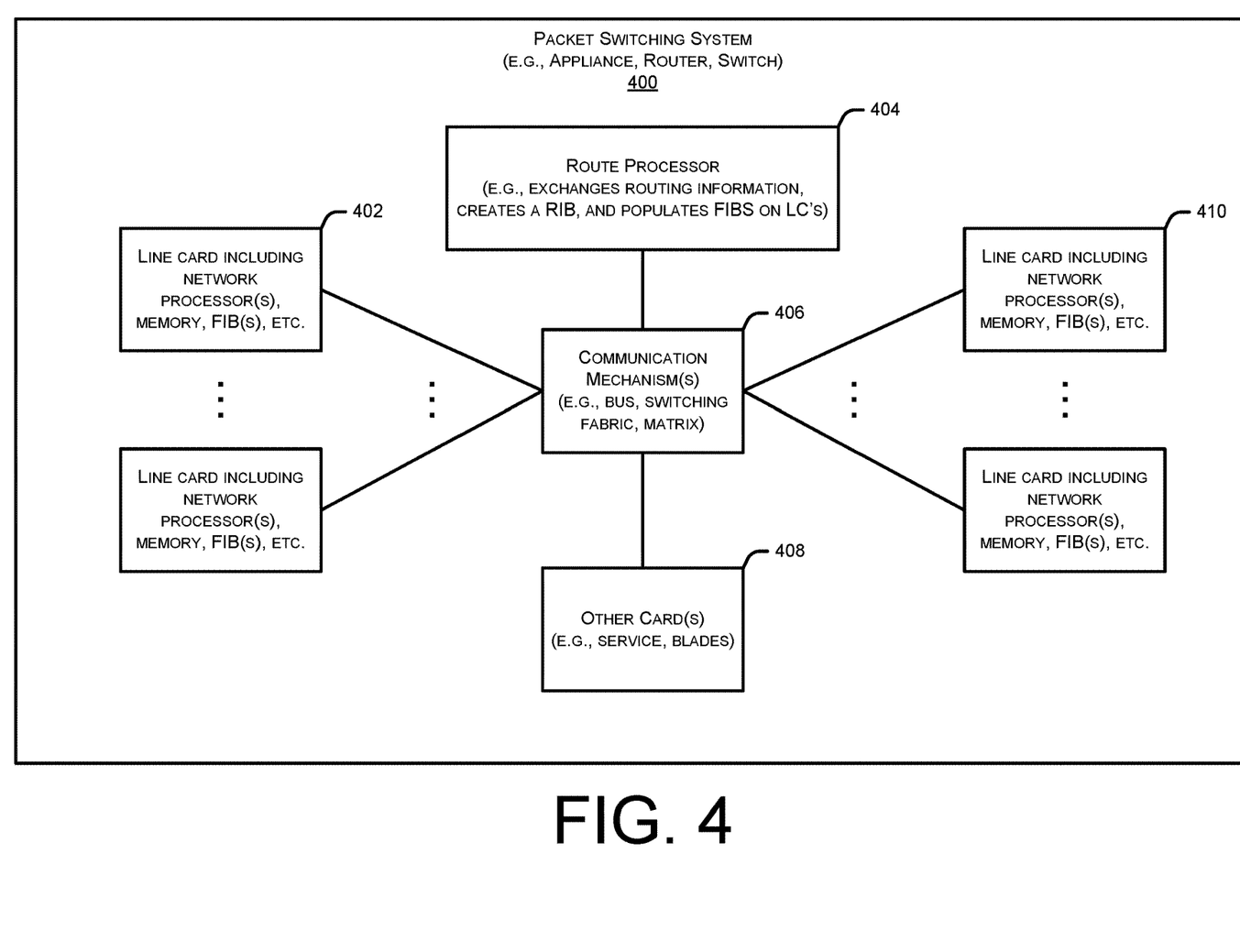
FIG. 4 illustrates a block diagram illustrating an example packet switching system that can be utilized to implement various aspects of the technologies disclosed herein.

FIG. 4 illustrates a block diagram illustrating an example packet switching device (or system) 400 that can be utilized to implement various aspects of the technologies disclosed herein. In some examples, packet switching device(s) 400 may be employed in various networks, such as, for example, the network made up of the network devices 102-108 as described with respect to FIG. 1.

In some examples, a packet switching device 400 may comprise multiple line card(s) 402, 410, each with one or more network interfaces for sending and receiving packets over communications links (e.g., possibly part of a link aggregation group). The packet switching device 400 may also have a control plane with one or more processing elements for managing the control plane and/or control plane processing of packets associated with forwarding of packets in a network. The packet switching device 400 may also include other cards 408 (e.g., service cards, blades) which include processing elements that are used to process (e.g., forward/send, drop, manipulate, change, modify, receive, create, duplicate, apply a service) packets associated with forwarding of packets in a network. The packet switching device 400 may comprise hardware-based communication mechanism 406 (e.g., bus, switching fabric, and/or matrix, etc.) for allowing its different entities, line cards 402, 404, 408 and 410 to communicate. Line card(s) 402, 410 may typically perform the actions of being both an ingress and/or an egress line card 402, 410, in regard to multiple other particular packets and/or packet streams being received by, or sent from, packet switching device 400.

Figure 5:
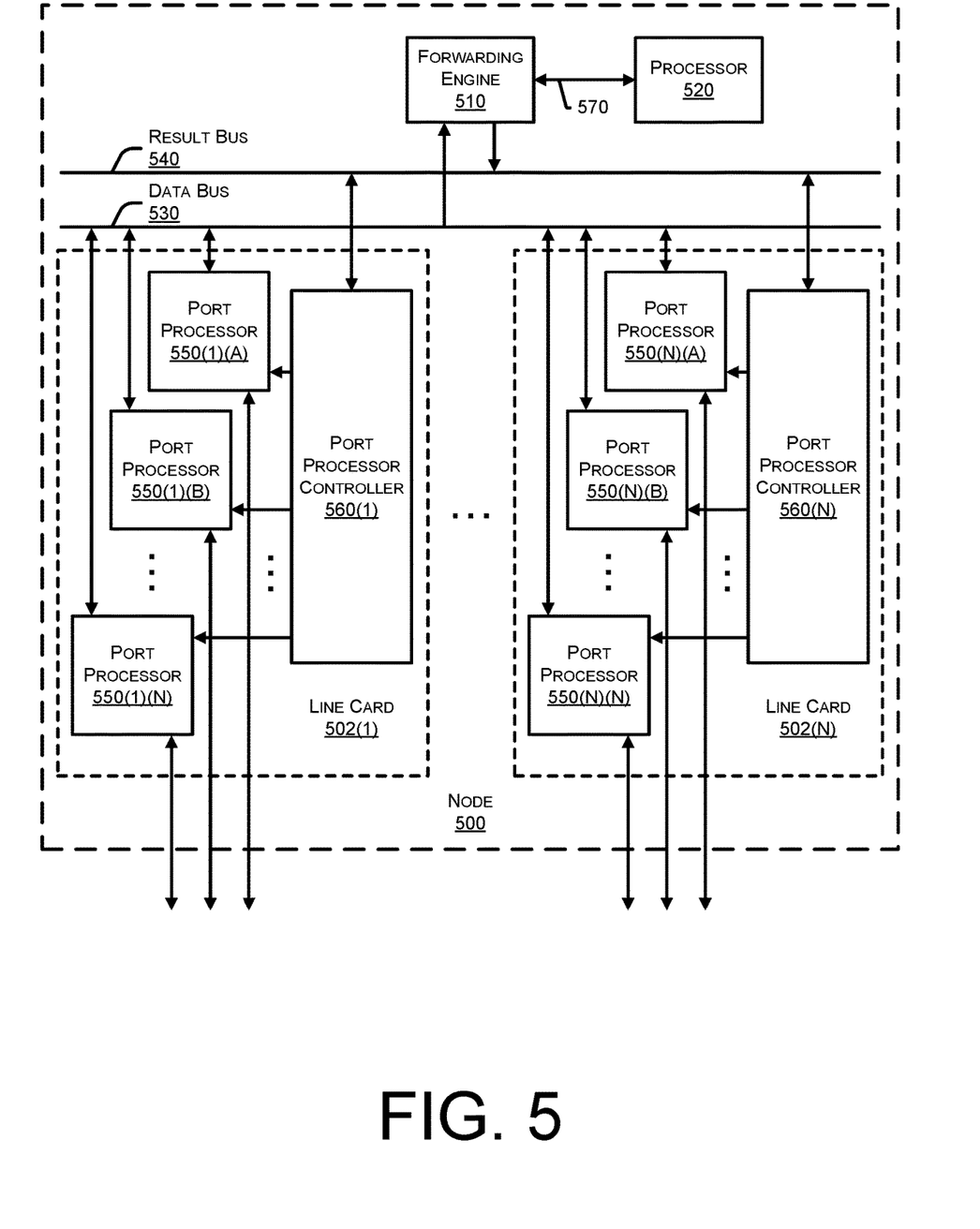
FIG. 5 illustrates a block diagram illustrating certain components of an example node that can be utilized to implement various aspects of the technologies disclosed herein.

FIG. 5 illustrates a block diagram illustrating certain components of an example node 500 that can be utilized to implement various aspects of the technologies disclosed herein. In some examples, node(s) 500 may be employed in various networks, such as, for example, the network made up of the network devices 102-108 as described with respect to FIG. 1.

In some examples, node 500 may include any number of line cards 502 (e.g., line cards 502(1)-(N), where N may be any integer greater than 1) that are communicatively coupled to a forwarding engine 510 (also referred to as a packet forwarder) and/or a processor 520 via a data bus 530 and/or a result bus 540. Line cards 802(1)-(N) may include any number of port processors 550(1)(A)-(N)(N) which are controlled by port processor controllers 560(1)-(N), where N may be any integer greater than 1. Additionally, or alternatively, forwarding engine 510 and/or processor 520 are not only coupled to one another via the data bus 530 and the result bus 540, but may also communicatively coupled to one another by a communications link 570.

The processors (e.g., the port processor(s) 550 and/or the port processor controller(s) 560) of each line card 502 may be mounted on a single printed circuit board. When a packet or packet and header are received, the packet or packet and header may be identified and analyzed by node 500 (also referred to herein as a router) in the following manner. Upon receipt, a packet (or some or all of its control information) or packet and header may be sent from one of port processor(s) 550(1)(A)-(N)(N) at which the packet or packet and header was received and to one or more of those devices coupled to the data bus 530 (e.g., others of the port processor(s) 550(1)(A)-(N)(N), the forwarding engine 510 and/or the processor 520). Handling of the packet or packet and header may be determined, for example, by the forwarding engine 510. For example, the forwarding engine 510 may determine that the packet or packet and header should be forwarded to one or more of port processors 550(1)(A)-(N)(N). This may be accomplished by indicating to corresponding one(s) of port processor controllers 560(1)-(N) that the copy of the packet or packet and header held in the given one(s) of port processor(s) 550(1)(A)-(N)(N) should be forwarded to the appropriate one of port processor(s) 550(1)(A)-(N)(N). Additionally, or alternatively, once a packet or packet and header has been identified for processing, the forwarding engine 510, the processor 520, and/or the like may be used to process the packet or packet and header in some manner and/or maty add packet security information in order to secure the packet. On a node 500 sourcing such a packet or packet and header, this processing may include, for example, encryption of some or all of the packets or packet and header's information, the addition of a digital signature, and/or some other information and/or processing capable of securing the packet or packet and header. On a node 500 receiving such a processed packet or packet and header, the corresponding process may be performed to recover or validate the packets or packet and header's information that has been secured.

Figure 6:
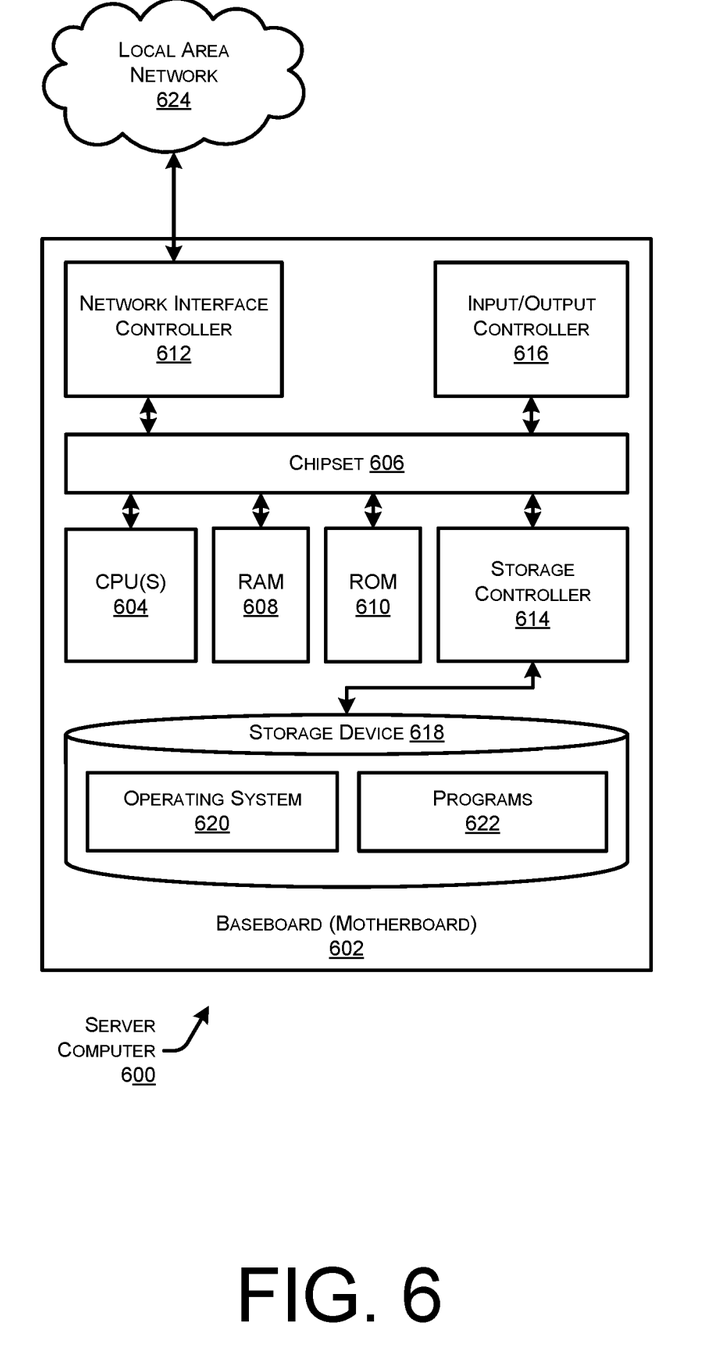
FIG. 6 is a computer architecture diagram showing an illustrative computer hardware architecture for implementing a server device that can be utilized to implement aspects of the various technologies presented herein.

FIG. 6 shows an example computer architecture for a computing device (or network routing device) 600 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. The computing device 600 may, in some examples, correspond to a network device(s) 102-108, the packet switching system 400, and/or the node 500 described herein with respect to FIGS. 1, 4, and 5, respectively.

The computing device 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computing device 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computing device 600. The chipset 606 can further provide an interface to a computer-readable storage medium such as a read-only memory ("ROM") 610 or non-volatile RAM ("NVRAM") for storing basic routines that help to startup the computing device 600 and to transfer information between the various components and devices. The ROM 610 or NVRAM can also store other software components necessary for the operation of the computing device 600 in accordance with the configurations described herein.

The computing device 600 can operate in a networked environment using logical connections to remote computing devices and computer systems through a network, such as the network 624. The chipset 606 can include functionality for providing network connectivity through a NIC 612, such as a gigabit Ethernet adapter. The NIC 612 is capable of connecting the computing device 600 to other computing devices over the network 624. It should be appreciated that multiple NICs 612 can be present in the computing device 600, connecting the computer to other types of networks and remote computer systems.

The computing device 600 can be connected to a storage device 618 that provides non-volatile storage for the computing device 600. The storage device 618 can store an operating system 620, programs 622, and data, which have been described in greater detail herein. The storage device 618 can be connected to the computing device 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computing device 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 can further read information from the storage device 618 by detecting the physical states or characteristics of one or more particular locations within the physical storage units.

In addition to the mass storage device 618 described above, the computing device 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 600. In some examples, the operations performed by the network device(s) 102-108, and or any components included therein, may be supported by one or more devices similar to computing device 600. Stated otherwise, some or all of the operations performed by the network device(s) 102-108, and or any components included therein, may be performed by one or more computing device 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computing device 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computing device 600.

In one embodiment, the storage device 618 or other computer-readable storage media is encoded with computer-executable instructions which, when loaded into the computing device 600, transform the computer from a general-purpose computing system into a special-purpose computer capable of implementing the embodiments described herein. These computer-executable instructions transform the computing device 600 by specifying how the CPUs 604 transition between states, as described above. According to one embodiment, the computing device 600 has access to computer-readable storage media storing computer-executable instructions which, when executed by the computing device 600, perform the various processes described above with regard to FIG. 3. The computing device 600 can also include computer-readable storage media having instructions stored thereupon for performing any of the other computer-implemented operations described herein.

The computing device 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computing device 600 might not include all of the components shown in FIG. 6, can include other components that are not explicitly shown in FIG. 6, or might utilize an architecture completely different than that shown in FIG. 6.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed at least in part by a first network device in an administrative network domain, the method comprising:
   identifying a second network device as a trusted peer device;
   receiving an advertisement from the second network device that indicates the second network device supports a peer-to-peer backup system;
   transmitting an acknowledgement to the second network device that the first network device supports the peer-to-peer backup system;
   receiving, from the second network device, a request to store backup data associated with the second network device on the first network device, the request including an amount of memory needed to store the backup data associated with the second network device;
   in response to the first network device having the amount of memory available in memory reserved for peer-to-peer backup data, transmitting, to the second network device, an indication that the amount of memory is available on the first network device, the indication including a recovery key;
   receiving, from the second network device, backup data associated with the second network device encrypted with the recovery key, wherein the backup data associated with the second network device comprises configuration data and telemetry data associated with the second network device; and
   storing the encrypted backup data associated with the second network device in memory reserved for peer-to-peer backup data.

2. The method of claim 1, further comprising:
   identifying a third network device as a trusted peer device;
   receiving an advertisement from the third network device that indicates the third network device supports the peer-to-peer backup system;
   transmitting an acknowledgement to the third network device that the first network device supports the peer-to-peer backup system;
   receiving, from the third network device a request for the encrypted backup data associated with the second network device; and
   transmitting the encrypted backup data associated with the second network device to the third network device.

3. The method of claim 2, wherein identifying the third network device as a trusted peer device further comprises receiving an indication from the third network device that the third network device is configured with a same certificate and private key as the second network device indicating the third network device is a replacement network device for the second network device.

4. The method of claim 1, further comprising:
   receiving a periodic indication from the second network device that the second network device is still active; and
   based on not receiving an indication from the second network device that the second network device is still active for more than a threshold amount of time, purging the backup data associated with the second network device from memory.

5. The method of claim 1, further comprising:
   in response to the first network device not having the amount of memory available in memory reserved for peer-to-peer backup data, transmitting, to the second network device, an indication of an amount of memory that is available on the first network device, the indication including a recovery key;
   receiving, from the second network device, a portion of backup data associated with the second network device encrypted with the recovery key; and
   storing the portion of encrypted backup data associated with the second network device in memory reserved for peer-to-peer backup data.

6. The method of claim 1, wherein the second network device is in a same administrative network domain as the first network device.

7. The method of claim 1, wherein the second network device is in a different administrative network domain than the first network device.

8. A system comprising:
   one or more processors; and
   one or more non-transitory computer-readable media storing instructions that, when executed, cause the one or more processors to perform operations comprising:
      identifying, by a first network device, a second network device as a trusted peer device;
      receiving, by the first network device, an advertisement from the second network device that indicates the second network device supports a peer-to-peer backup system;
      transmitting, by the first network device and to the second network device, an acknowledgement indicating that the first network device supports the peer-to-peer backup system;
      receiving, by the first network device and from the second network device, a request to store backup data associated with the second network device on the first network device, the request including an amount of memory needed to store the backup data associated with the second network device;
      in response to the first network device having the amount of memory available in memory reserved for peer-to-peer backup data, transmitting, from the first network device and to the second network device, an indication that the amount of memory is available on the first network device, the indication including a recovery key;
      receiving, by the first network device and from the second network device, backup data associated with the second network device encrypted with the recovery key, wherein the backup data associated with the second network device comprises configuration data and telemetry data associated with the second network device; and
      storing the encrypted backup data associated with the second network device in memory of the first network device reserved for peer-to-peer backup data.

9. The system of claim 8, the operations further comprising:
   identifying a third network device as a trusted peer device;
   receiving an advertisement from the third network device that indicates the third network device supports the peer-to-peer backup system;
   transmitting an acknowledgement to the third network device that the first network device supports the peer-to-peer backup system;
   receiving, from the third network device a request for the encrypted backup data associated with the second network device; and
   transmitting the encrypted backup data associated with the second network device to the third network device.

10. The system of claim 9, wherein identifying the third network device as a trusted peer device further comprises receiving an indication from the third network device that the third network device is configured with a same certificate and private key as the second network device indicating the third network device is a replacement network device for the second network device.

11. The system of claim 8, the operations further comprising:
receiving a periodic indication from the second network device that the second network device is still active; and
based on not receiving an indication from the second network device that the second network device is still active for more than a threshold amount of time, purging the backup data associated with the second network device from memory.

12. The system of claim 8, the operations further comprising:
in response to the first network device not having the amount of memory available in memory reserved for peer-to-peer backup data, transmitting, to the second network device, an indication of an amount of memory that is available on the first network device, the indication including a recovery key;
receiving, from the second network device, a portion of backup data associated with the second network device encrypted with the recovery key; and
storing the portion of encrypted backup data associated with the second network device in memory reserved for peer-to-peer backup data.

13. The system of claim 8, wherein the second network device is in a same administrative network domain as the first network device.

14. The system of claim 8, wherein the second network device is in a different administrative network domain than the first network device.

15. One or more non-transitory computer-readable media storing instructions that, when executed, cause one or more processors to perform operations comprising:
identifying, by a first network device, a second network device as a trusted peer device;
receiving, by the first network device, an advertisement from the second network device that indicates the second network device supports a peer-to-peer backup system;
transmitting, by the first network device and to the second network device, an acknowledgement indicating that the first network device supports the peer-to-peer backup system;
receiving, by the first network device and from the second network device, a request to store backup data associated with the second network device on the first network device, the request including an amount of memory needed to store the backup data associated with the second network device;
in response to the first network device having the amount of memory available in memory reserved for peer-to-peer backup data, transmitting, from the first network device and to the second network device, an indication that the amount of memory is available on the first network device, the indication including a recovery key, wherein the backup data associated with the second network device comprises configuration data and telemetry data associated with the second network device;
receiving, by the first network device and from the second network device, backup data associated with the second network device encrypted with the recovery key; and
storing the encrypted backup data associated with the second network device in memory of the first network device reserved for peer-to-peer backup data.

16. The one or more non-transitory computer-readable media of claim 15, the operations further comprising:
identifying a third network device as a trusted peer device;
receiving an advertisement from the third network device that indicates the third network device supports the peer-to-peer backup system;
transmitting an acknowledgement to the third network device that the first network device supports the peer-to-peer backup system;
receiving, from the third network device a request for the encrypted backup data associated with the second network device; and
transmitting the encrypted backup data associated with the second network device to the third network device.

17. The one or more non-transitory computer-readable media of claim 16, wherein identifying the third network device as a trusted peer device further comprises receiving an indication from the third network device that the third network device is configured with a same certificate and private key as the second network device indicating the third network device is a replacement network device for the second network device.

18. The one or more non-transitory computer-readable media of claim 15, the operations further comprising:
in response to the first network device not having the amount of memory available in memory reserved for peer-to-peer backup data, transmitting, to the second network device, an indication of an amount of memory that is available on the first network device, the indication including a recovery key;
receiving, from the second network device, a portion of backup data associated with the second network device encrypted with the recovery key; and
storing the portion of encrypted backup data associated with the second network device in memory reserved for peer-to-peer backup data.

19. The one or more non-transitory computer-readable media of claim 15, the operations further comprising:
receiving a periodic indication from the second network device that the second network device is still active; and
based on not receiving an indication from the second network device that the second network device is still active for more than a threshold amount of time, purging the backup data associated with the second network device from memory.

20. The one or more non-transitory computer-readable media of claim 15, wherein the second network device is in a different administrative network domain than the first network device.

* * * * *